Figure 1:
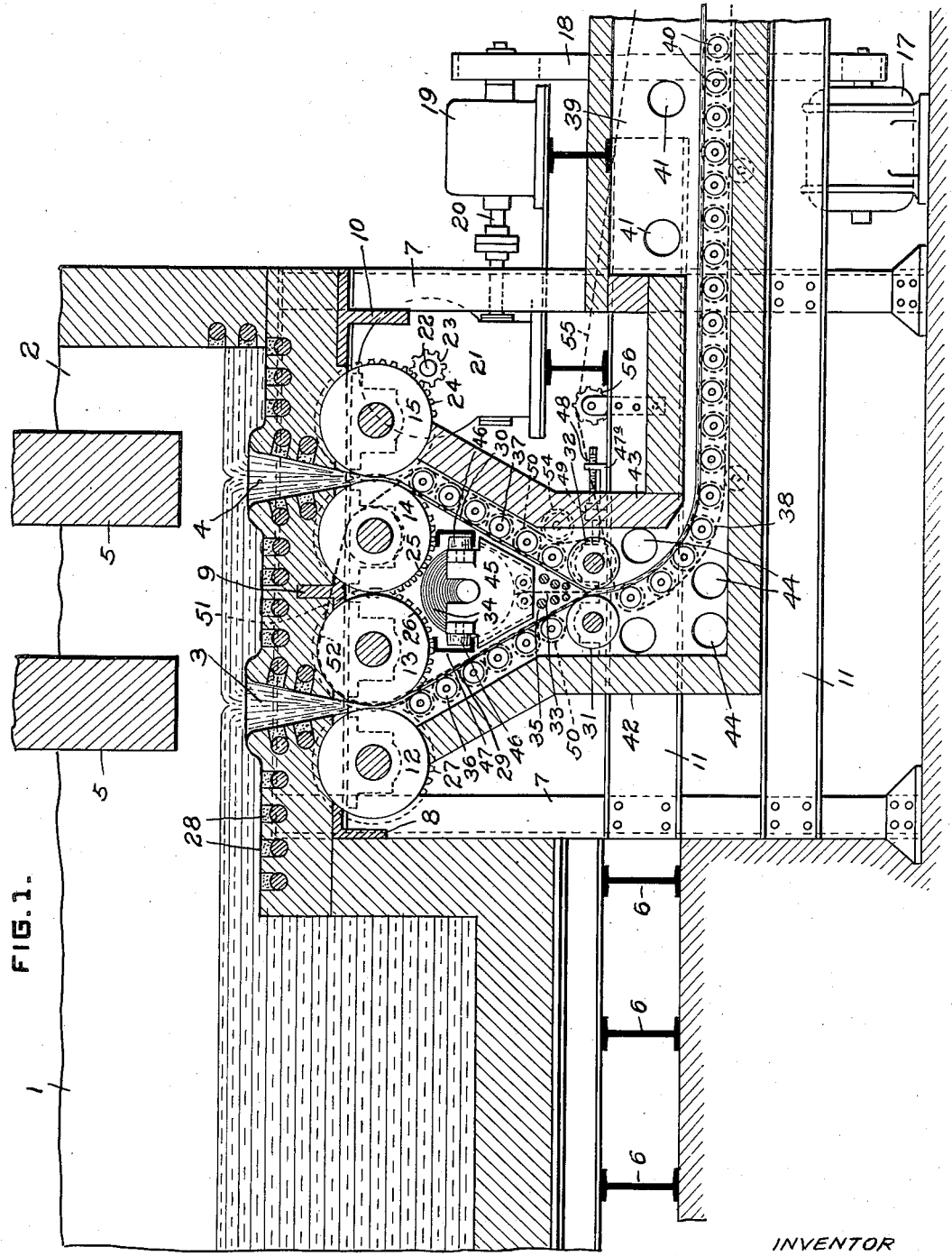

June 9, 1925.

F. GELSTHARP 1,541,637

METHOD AND APPARATUS FOR MAKING WIRE GLASS

Filed Sept. 26, 1922

4 Sheets-Sheet 3

INVENTOR
Frederick Gelstharp
by James C. Bradley
atty

June 9, 1925. 1,541,637
F. GELSTHARP
METHOD AND APPARATUS FOR MAKING WIRE GLASS
Filed Sept. 26, 1922 4 Sheets-Sheet 4
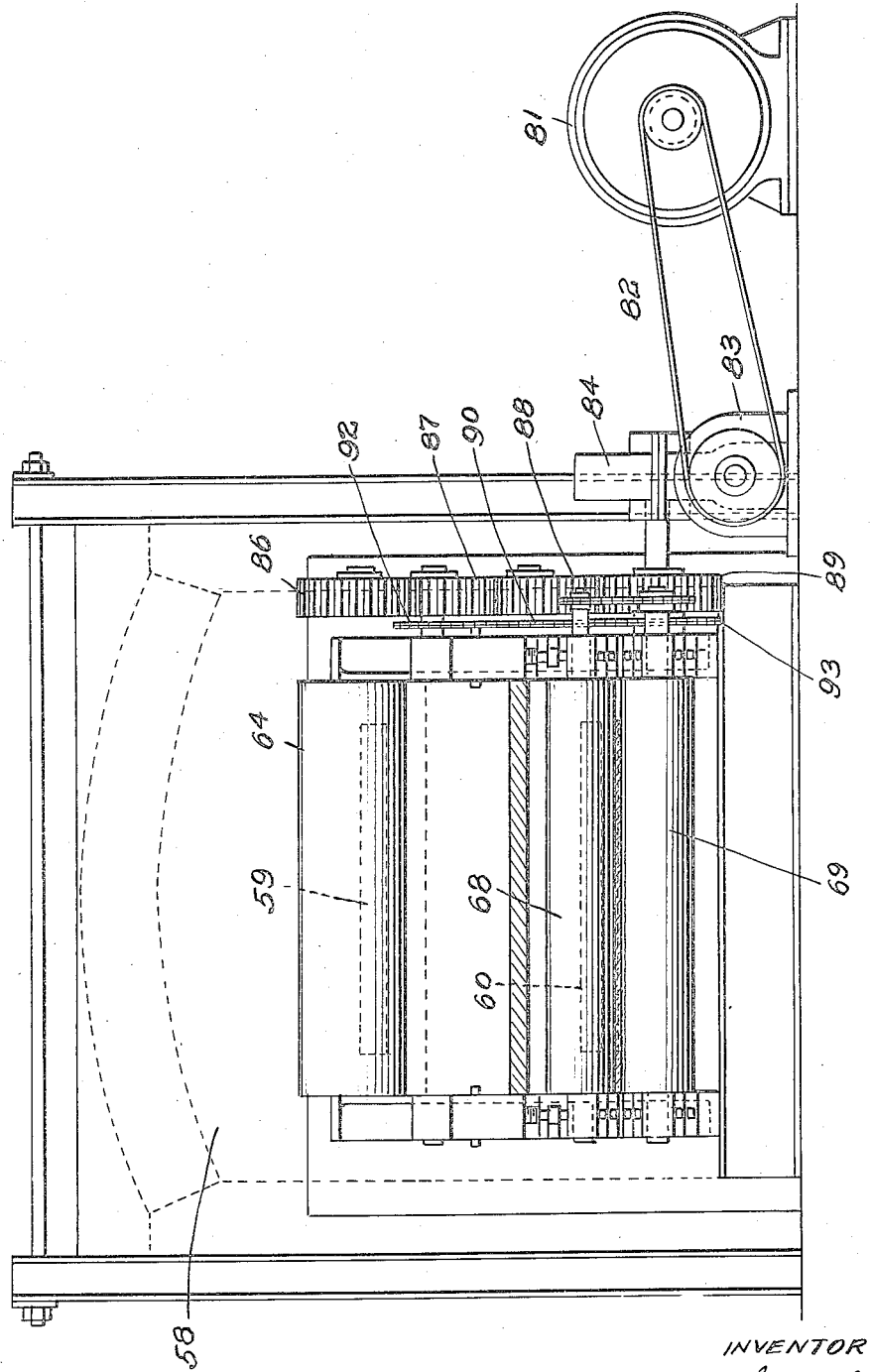
INVENTOR
Frederick Gelstharp
by
James C. Bradley
atty Patented June 9, 1925.

1,541,637

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

METHOD AND APPARATUS FOR MAKING WIRE GLASS.

Application filed September 26, 1922. Serial No. 590,636.

*To all whom it may concern:*

Be it known that I, FREDERICK GELSTHARP, a citizen of Great Britain, and a resident of Tarentum, in the county of Allegheny and State of Pennsylvania, have made a new and useful invention in Improvements in Methods and Apparatus for Making Wire Glass, of which the following is a specification.

Figure 2:
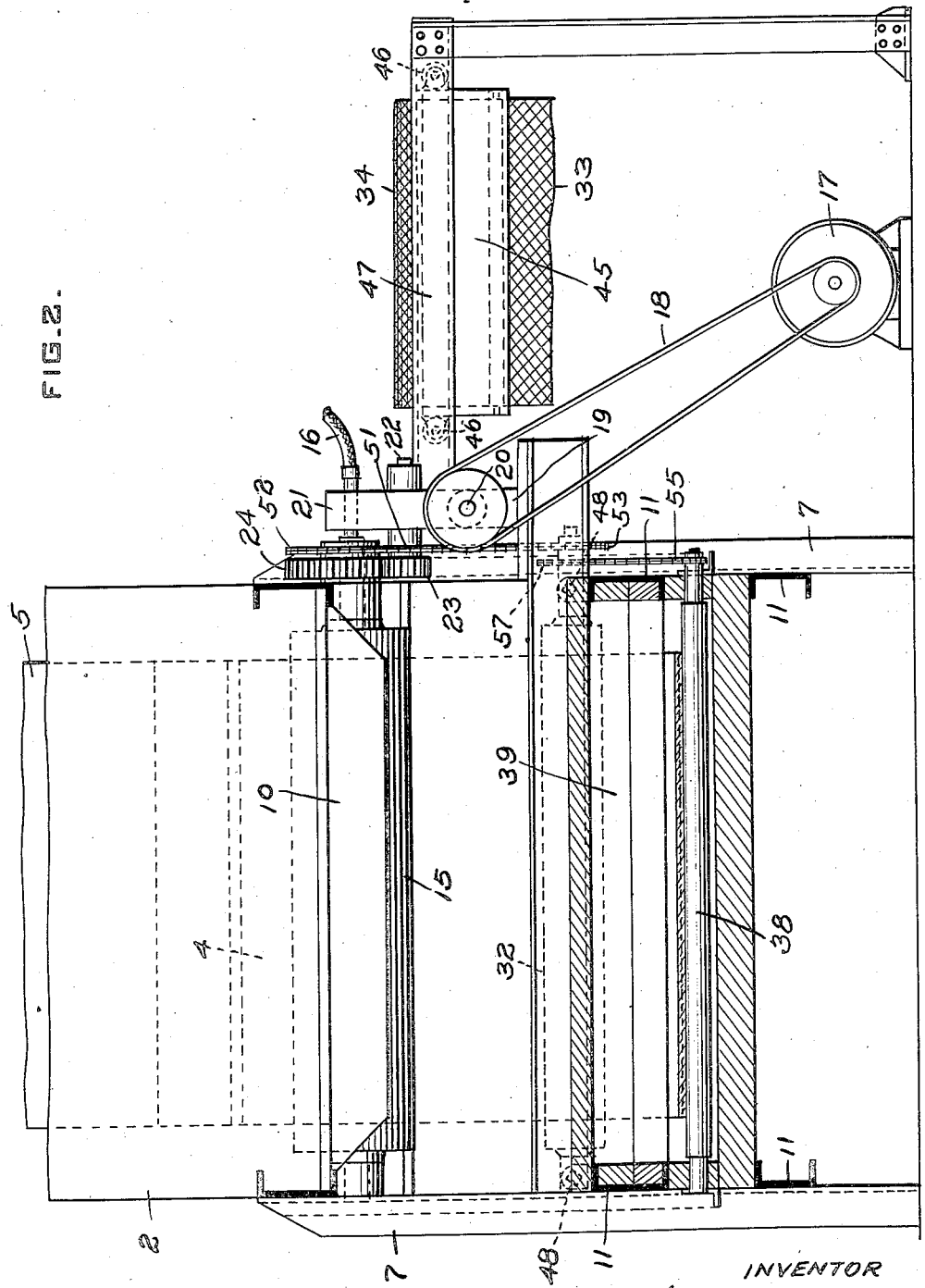
Figure 3:
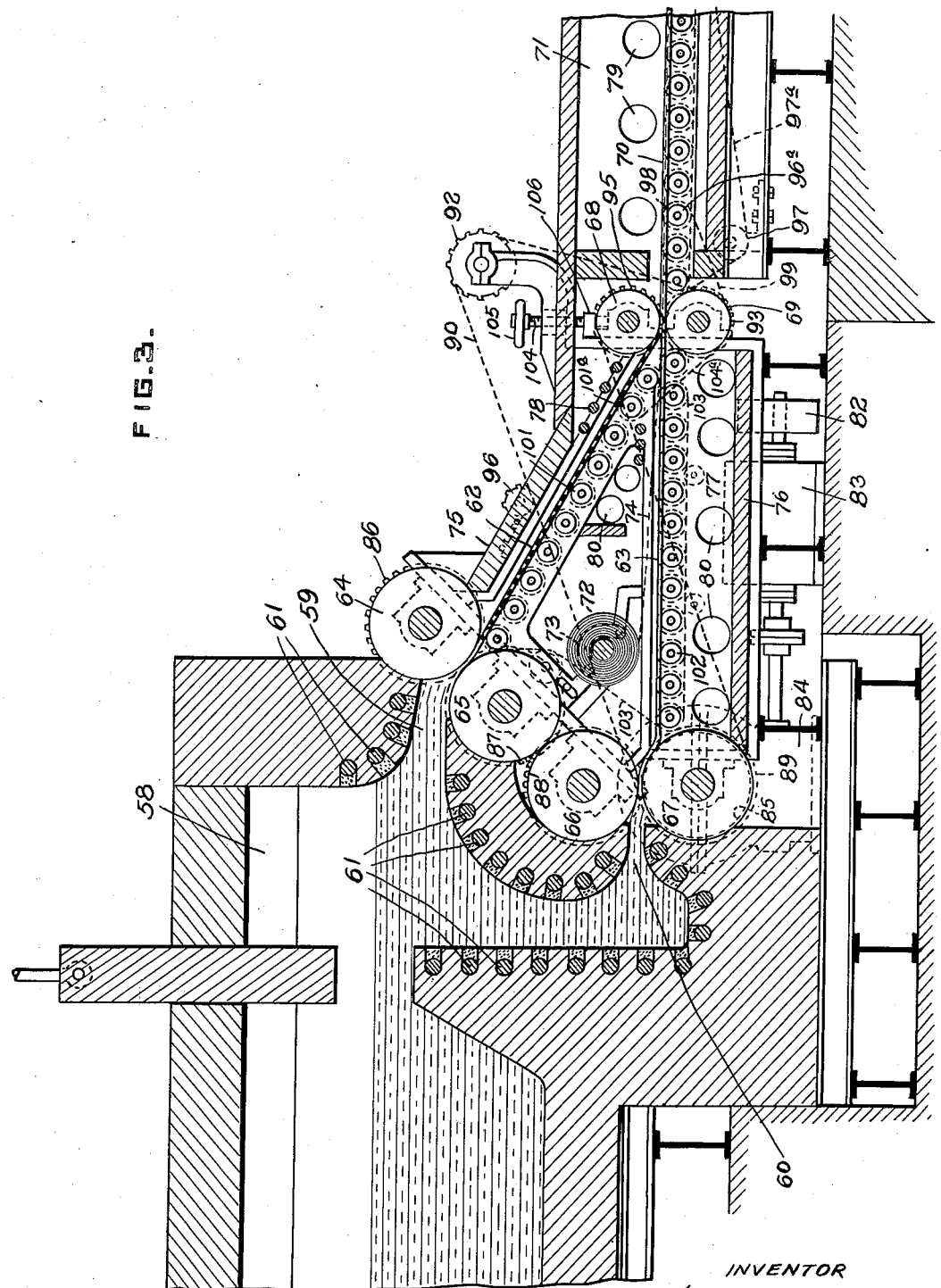

The invention relates to an improvement in the making of wire glass by what is known as the sandwich method. It has for its principal objects the provision of an improved method and apparatus for producing the glass more rapidly and cheaply and of a better quality than has heretofore been done, and by a continuous process, as opposed to the intermittent sandwich processes heretofore used, in which it has been the practice to ladle the glass to provide the source of supply for the two ribbons employed. Two forms of apparatus are illustrated in which the ribbons are produced from a single, continuously operated tank, but it will be understood that the invention is not limited to use in this way, but is of broad application. In the drawings:

Figure 1 is a vertical section through the apparatus including a portion of the tank and leer; Fig. 2 is a partial end elevation of and partial transverse section through the apparatus of Fig. 1; and Figs. 3 and 4 are views similar to those of Figs. 1 and 2, but showing a modification.

Briefly stated the process contemplates the continuous flowing of two ribbons of glass from sources of supply, so that they converge, feeding a wire mesh between the two ribbons, applying pressure to the outer faces of the ribbons to weld them together with the wire mesh therebetween, and then carrying the glass ahead through a leer where it is flattened and annealed.

Referring to the drawings, 1 is a melting tank provided with suitable means for melting and fining the batch, and 2 is a forehearth at one end of the tank provided with a pair of outlets 3 and 4 and a pair of gates 5, 5 opposite the openings for closing the same when it is desired to stop the flow and also between operations. The tank 1 is supported upon a suitable framework including the I beams 6, while the forehearth is carried by a framework consisting of the vertical channels 7 and the longitudinal channels 11 and the transverse sections 8, 9 and 10, such framework also serving to support the rolling mechanism and leer hereinafter described.

The glass emerging from the openings 3 and 4 passes between the pairs of rolls 12 and 13 and 14 and 15, such rolls preferably being hollow and water cooled by means of connections 16 swiveled to the end of the rolls. The rolls are driven from the motor 17, such motor having the belt connection 18 to the reducing mechanism in the casing 19, and such reducing mechanism being connected by means of the shaft 20 and worm drive in the casing 21 with the shaft 22. This shaft carries a pinion 23 meshing with a spur gear 24 keyed to the shaft of the roller 15. The other three rollers 14, 13 and 12 are driven from the gear 24 by means of the gears 25, 26 and 27 carried by the shafts of the respective rolls.

In order to regulate the temperature of the glass in the forehearth 2 and in the feeders 3 and 4, the electrical heating coils 28 may be employed. These coils are preferably of resistance material, such as nichrome, located in grooves in the clay work and suitably insulated and sealed in by refractory cement. This heating means may be used not only to regulate the temperature of the glass, but also to melt the glass in case it should solidify or freeze intermediate successive drawing operations.

The glass passing between the rollers 12 and 13 and 14 and 15 is reduced in thickness and formed into the ribbons 29 and 30, such ribbons converging and passing between the pair of squeezing rolls 31 and 32, at which point the wire mesh 33 is fed between the two ribbons from the spool of wire 34. In order to reheat the inner faces of the ribbons before they engage and provide a proper welding temperature, the electrical heating coil 35 is preferably employed, such coil also being of high resistance material, such as nichrome. The ribbons of glass are guided and supported in their passage to the squeezing rolls by means of the sets of rolls 36 and 37 and after the sheet passes the squeezing rolls, it is supported upon the rollers 38 which turn the sheet laterally into the leer 39.

Any desired type of leer may be employed, but it is preferably of the roller type having the rolls 40 support the glass and provided with the openings 41 for supplying gas to give the necessary heating and annealing effect. The glass sheets in their passage from the rolls to the leer are preferably enclosed between suitable walls 42 and 43 in order to prevent too rapid cooling. The compartment thus formed is partially heated from the leer 39 and as much additional heat as is necessary may be provided by means of suitable burners extending into the compartment through the ports 44.

Sufficient heat is provided to maintain the plasticity of the glass so that it may assume the curve necessary in passing from a vertical to a horizontal position, and either before or after the sheet enters the leer, sufficient heat is preferably applied to bring the sheet of glass up to a uniform temperature throughout so that it will flatten properly in the leer. The glass may sag slightly as it enters the leer or shortly thereafter, but from this point on the temperature gradually drops and the sheet becomes flat and hardens as it passes through the leer. The bringing of the glass to a uniform temperature at the entrance of the leer is important as this prevents its warping during the subsequent cooling operation, which would not be the case with the sheet having a chilled skin and a much higher temperature within such skin.

The spool of wire netting 34 is preferably mounted in a carrier 45 having rolls 46 secured along its sides and adapted to lie between the flanges of the channels 47.

The squeezing rolls 31 and 32 are arranged for relative movement in order to regulate the pressure applied to the sheet, this being accomplished by mounting the bearings of the roll 32 upon a suitable slide whose end 47ª carries the adjusting screw 48. This adjusting screw is swiveled in a fixed block 49 so that by rotating the screw the roll 32 may be moved toward and from the other squeezing roll 31. The sets of rolls 36 and 37 are provided at their ends with sprockets 50. These sprockets are driven by a chain 51 which passes around a sprocket 52 on the shaft of the roll 13 and around the sprocket 53 on the shaft of the squeezing roll 32. The tension of the chain may be adjusted by a suitable take-up device in the form of a sprocket 54 engaging the sprocket chain and adjustable so as to tighten or loosen the chain. In passing the shaft of the roll 14 the chain 51 passes over a suitable idler sprocket mounted on the shaft of such roll.

The rolls 38 and 40 are provided at their ends with sprockets and are driven by means of a sprocket chain 55 passing along such sprockets around the adjustable take-up sprocket 56. This chain 55 is driven from a sprocket 57 on the end of the rolls 32, the chain engaging the lower side of this sprocket just before passing over the take-up sprocket 56.

Figs. 3 and 4 illustrate a modification in which the two ribbons of glass are withdrawn laterally from the tank instead of vertically as in the construction heretofore described. Referring to Figs. 3 and 4, 58 is the end of the melting tank or dog house, provided with a pair of outlet openings 59 and 60, and with electrical heating coils 61 disposed adjacent the outlet passages and corresponding in function to the heating coils 28 of Fig. 1. The glass as it flows out of the tank is formed into two ribbons 62 and 63 by means of the pairs of rolls 64 and 65 and 66 and 67, the two ribbons converging and passing between the squeezing rolls 68 and 69 to form the final ribbon 70 which passes into the leer 71. A spool of wire mesh 72 is supported in a suitable carrier 73 and the wire mesh 74 from the spool is directed between the squeezing rolls as in the other type of construction. The ribbons 62 and 63 are shielded from the outside air by means of the walls 75 and 76 and additional heating means for the ribbons are provided adjacent their point of convergence in the form of the electric heating coils 77 and 78.

Heat is provided to the leer and to the space between the walls 75 and 76 by any suitable means, such for instance, as by gas burners extending into the openings 79 and 80. The roll 67 is driven from the motor 81 through the intermediary of the belt 82, the gear reducer 83 and the worm drive 84, the worm wheel 85 (Fig. 3) of such drive being keyed to the shaft of the roll 67. The shafts of the rolls 64, 65, 66 and 67 carry the spur gears 86, 87, 88 and 89 successively intermeshing as indicated in Fig. 3, so that the roll 66 is driven from the roll 67, the roll 65 from the roll 66 and the roll 64 from the roll 65.

The squeezing rollers 68 and 69 are driven from the sprocket chain 90, which passes around a sprocket 89 keyed to the axle of the roll 67, beneath the take-up sprocket 96, over the sprocket 92, and around the sprockets 93 and 95 carried by the axles of the squeeze rolls 69 and 68. The squeeze roll 68 is made adjustable toward and from the squeeze roll 69 by means of the screw 104 provided with a handwheel 105 and having its lower end swiveled in a frame 106 which carries the bearings of the roll 68.

The ends of the leer rolls 70 each carry sprockets around which pass the chain 96, such chain also passing around the take-up sprocket 97. One of the leer rolls 96ª is also provided with an additional sprocket 98 and a chain 99 extends around this sprocket and around another sprocket keyed to the axle of the shaft 69, so that the roll 96ª is driven from the squeeze roll 69. The chain 96 passes over and engages the second sprocket on the roll 96ª, so that the leer rolls are all driven from this roll 96ª.

The two ribbons 62 and 63 are guided upon the sets of rolls 101 and 102 and these rolls are driven by means of the sprocket chain 103 which passes around sprockets keyed to the ends of each of the rolls. One of these rolls 101ª is provided with two sprockets, the smaller of which is driven by a chain 104ª which passes around a sprocket on the axle of the squeeze roll 69. The second or larger sprocket on this roll 101ª engages and drives the chain 103 which passes around the sprockets of the rolls 101 and 102.

What I claim is:

1. A process of making wire glass which consists in melting and fining a bath of glass to constitute a source of supply, continuously flowing two ribbons of glass from such source of supply under the same head pressure so that they converge and meet, feeding a metallic mesh between the ribbons, and applying pressure to the outer faces of the ribbons after they meet to cause them to weld together with the metallic mesh embedded therebetween.

2. A process of making wire glass which consists in melting and fining a bath of glass to constitute a source of supply, continuously flowing two ribbons of glass from such source of supply under the same head pressure so that they converge and meet, heating the inner faces only of the ribbons before they meet to soften them, feeding a metallic mesh between the ribbons, and applying pressure to the outer faces of the ribbons after they meet to cause them to weld together with the metallic mesh embedded therebetween.

3. In combination in apparatus for forming wire glass, a tank having a pair of parallel outlet slots, a pair of rollers at the exit end of each outlet adapted to receive therebetween the glass flowing from the outlet, supporting and guiding means in advance of each pair of rollers arranged to bring the two sheets together, means for supplying a metal mesh between the sheets and means for engaging the outer faces of the sheets and pressing them together.

4. In combination in apparatus for forming wire glass, a tank having a pair of parallel outlets, a pair of rollers at the exit end of each outlet adapted to receive therebetween the glass flowing from the outlets, means whereby at least one of each pair of rolls is driven, supporting and guiding means in advance of each pair of rollers for bringing the two ribbons together, means for maintaining the temperature of the ribbons until they are brought into engagement, means for supplying a metal mesh between the sheets, and means for engaging the outer faces of the sheets and pressing them together.

5. In combination in apparatus for forming wire glass, a tank having a pair of parallel outlets, a pair of rollers at the exit end of each outlet adapted to receive therebetween the glass flowing from the outlets, means whereby at least one of each pair of rolls is driven, supporting and guiding means in advance of each pair of rollers for bringing the two ribbons together, means for reheating the inner faces of the ribbons just before they are brought together, means for supplying a metal mesh between the sheets, and means for engaging the outer faces of the sheets and pressing them together.

In testimony whereof, I have hereunto subscribed my name this 22nd day of August, 1922.

FREDERICK GELSTHARP.